VAPOR PHASE PROCESS FOR PREPARING 2,2-DIALKYL-4-PENTENALS

Charles W. Hargis and Howard S. Young, Kingsport, Tenn., assignors to Eastman Kodak Company, Rochester, N.Y., a corporation of New Jersey
No Drawing. Filed Sept. 4, 1963, Ser. No. 306,607
12 Claims. (Cl. 260—601)

This invention relates to an improved vapor phase process for the preparation of 2,2-dialkyl-4-pentenals from certain aldehydes and allyl alcohol employing new and improved catalysts promoted with acidic ingredients.

It is known that 2,2-dimethyl-4-pentenal is formed by passing a mixture of allyl alcohol and isobutyraldehyde over activated carbon or silica gel at elevated temperatures. However, this process has a serious drawback for practical operation in that the rate of conversion obtained is relatively low, that is, less than 25% conversion to the pentenal product based on the allyl alcohol fed to the system. We have now found that markedly better conversions on the order of from about 35–65%, based on the allyl alcohol fed, are obtained by employing catalysts comprising activated carbon, silica gel, and the like, impregnated with certain acidic type compounds which promote and greatly enhance the conversions of allyl alcohol and appropriate aldehydes, in vapor phase, to the desired 2,2-dimethyl-4-pentenals.

It is, accordingly, an object of the invention to provide a new and improved vapor phase process for preparing 2,2-dimethyl-4-pentenals from allyl alcohol and appropriate aldehydes employing as catalysts certain support materials impregnated with a select group of acidic compounds.

Another object is to provide catalysts for carrying out the process of the invention comprising activated carbon and silica gel impregnated with the select group of inorganic acidic compounds.

Another object is to provide a continuous vapor phase process for preparing the 2,2-dialkyl-4-pentenal compounds.

Other objects will become apparent from the general description and examples hereinafter.

In accordance with the invention, 2,2-dialkyl-4-pentenals are prepared by passing a feed mixture comprising allyl alcohol and a saturated aliphatic aldehyde of the general formula:

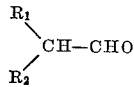

wherein $R_1$ and $R_2$ each represents the same or different alkyl group of from 1–4 carbon atoms, e.g. methyl, ethyl, propyl, isopropyl, butyl, etc., groups, in vapor phase at a temperature of from 125–450° C., and preferably at from 175–250° C., over a suitable inorganic acidic type catalyst contained, for example, in a tubular type of reactor, and recovering the pentenal product from the effluent stream from the reactor by conventional separation means, e.g. by cooling and subjecting the resulting condensate to fractional distillation. The reaction may be illustrated as follows:

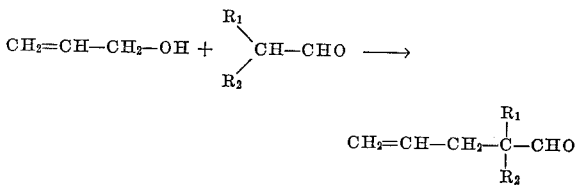

wherein $R_1$ and $R_2$ are as above defined. Suitable saturated aliphatic aldehydes for this reaction include isobutyraldehyde, 2-ethyl butanal, 2-methyl butanal, 2-methyl pentanal, 2-ethyl pentanal, 2-methyl hexanal, 2-ethyl hexanal, etc.

The molar ratio of allyl alcohol to aldehyde may vary from 1:0.1 to 1:10, but preferably from 1:0.5 to 1:4. The gaseous hourly space velocity may be varied over a wide range, for example, values (STP) from about 100 to 10,000, and preferably from 150 to 500. Advantageously, an inert diluent such as nitrogen, argon, carbon dioxide, or the like, can be added with the feed to facilitate removal of the product from the reaction zone. The reaction is not significantly pressure dependent, and pressures up to about 5 atmospheres may be used.

The promoted catalysts are conveniently prepared by treatment of the support material with a solution or dispersion containing sufficient acidic constituent to give a concentration thereof ranging from 0.1–25% by weight of the catalyst following evaporation of the solvent. The solvent can be water or an organic liquid in which the acidic constituent can be dissolved or dispersed prior to impregnation of the support. The preferred support materials are activated carbon and silica gel. However, other support materials obtainable in high surface area form, but which are not so strongly basic in themselves as to destroy the acidic reaction of ions used for impregnating the supports, may also be employed, for example, titania, zirconia, thoria, tantalum pentoxide, niobium pentoxide, or the like. Suitable acidic-type compounds for impregnating the support materials include inorganic salts whose aqueous solutions are acidic, for example, manganous sulfate, zinc sulfate, calcium chloride, magnesium sulfate, aluminum sulfate, alkali metal acid sulfates such as sodium acid sulfate, potassium acid sulfate, etc., in either anhydrous or hydrated forms. Other materials which will impart an acid reaction to the catalysts can also be used for impregnating the support materials such as ions derived from phosphorus, arsenic, vanadium, molybdenum, and the like, either as free acids of these elements in the support material is critical. For example, we have found that phosphoric acid in concentrations of from about 1.0–2.0% by weight of the catalyst is a highly effective acidic type promoter, whereas at higher concentrations it is not a feasible promoter (Examples 11 and 12). Phosphoric acid is also ineffective when added to just the feed mixture (Example 13).

The definitions used in the examples are as follows:
The percent yield of 2,2-dialkyl-4-pentenal=

$$\frac{\text{moles of pentenal formed}}{\text{moles of allyl alcohol fed}} \times 100$$

The percent yield of 2,2-dialkyl-4-pentenal=

$$\frac{\text{moles of pentenal formed}}{\text{moles of allyl alcohol consumed}} \times 100$$

Gaseous hourly space velocity (GHSV) is defined as the number of volumes of feed gases (STP) which pass through one volume of catalyst bed in one hour.

The following examples will serve further to illustrate the process of the invention.

Example 1

This example illlustrates the relatively low conversions obtained when activated carbon is used alone, that is, without impregnation with an acidic type promoter.

During a period of 90 minutes, a mixture containing 0.129 mole of allyl alcohol, 0.258 mole of isobutyraldehyde and 0.402 mole of nitrogen was passed over 60 ml. of granular activated carbon (Carbide and Carbon Chemicals Corporation. Columbia Grade CXAL) at a temperature of 200° C. The reaction product was collected in traps cooled to 10° C. and −80° C. analysis of the reaction product showed 0.032 mole of 2,2-dimethyl-4-pentenal and 0.090 mole of unchanged allyl alcohol along with unchanged isobutyraldehyde. Thus, only 24.8% of the allyl alcohol fed was converted to the pentenal product, while the yield based on allyl alcohol consumed was 82.1%.

*Example 2*

The procedure of Example 1 was repeated except the catalyst consisted of 20% $CaCl_2$ on the carbon support. After the 90 minute run, analysis of the product collected as in Example 1, showed 0.063 mole of 2,2-dimethyl-4-pentenal and 0.048 mole of unaltered allyl alcohol. The conversion and yield amounted to 48.8% and 77.8% respectively. Thus, the rate of production of the olefinic aldehyde was substantially increased while employing the $CaCl_2$-impregnated catalyst.

*Example 3*

During a period of 90 minutes, a mixture containing 0.095 mole of allyl alcohol, 0.190 mole of isobutyraldehyde and 0.402 mole of nitrogen was passed over 60 ml. of a catalyst consisting of 5% $CaCl_2$ on same type of activated carbon as in Example 1, at a temperature of 195–200° C. Analysis of the reaction product collected as in Example 1 showed 0.043 mole of 2,2-dimethyl-4-pentenal and 0.044 mole of unchanged allyl alcohol. The conversion amounted to 45.2% and the yield to 84.3%.

*Example 4*

During a run lasting for 90 minutes, there was fed a gaseous mixture containing 0.0935 mole of allyl alcohol, 0.187 mole of isobutyraldehyde and 0.402 mole of nitrogen to 60 ml. of catalyst consisting of 5% $MnSO_4$ on same type of activated carbon as in Example 1 and heated to 195–200° C. Analysis of the product collected as in Example 1 showed 0.058 mole of 2,2-dimethyl-4-pentenal and 0.030 mole of unchanged allyl alcohol. The conversion and yield amounted to 62.0% and 91.4% respectively.

*Example 5*

The procedure of Example 4 was repeated except the catalyst consisted of 5% $ZnSO_4$ on activated carbon such as used in the preceding example. Analysis of the reaction product collected during the 90 minute run showed 0.0497 mole of 2,2-dimethyl-4-pentenal and 0.0375 mole of unchanged allyl alcohol corresponding to a conversion of 53.2% and a yield of 88.7%.

*Example 6*

The procedure of Example 4 was repeated except the catalyst consisted of 5% $Al_2(SO_4)_3$ on the activated carbon. Analysis of the product showed 0.034 mole of 2,2-dimethyl-4-pentenal and 0.040 mole of unchanged allyl alcohol. The conversion in this run amounted to 36.4% and the yield to 63.5%. Thus, $Al_2(SO_4)_3$ was indicated to be less specific in its promoting activity than were $CaCl_2$, $MnSO_4$, or $ZnSO_4$, but gave a higher rate of reaction than was obtained with the unpromoted carbon (Example 1).

*Example 7*

The procedure of Example 4 was repeated except the catalyst consisted of 5% $MgSO_4$ on the activated carbon. Analysis of the reaction product collected during the 90 minute run showed 0.0552 mole of 2,2-dimethyl-4-pentenal and 0.0315 mole of unchanged allyl alcohol. The conversion and yield stated as before amounted to 59.0% and 89.0% respectively.

*Example 8*

The procedure of Example 4 was repeated except the catalyst consisted of 5% $MnSO_4$ on silica gel (Davison Chemical Corporation, Grade 70). Analysis of the reaction product showed 0.038 mole of 2,2-dimethyl-4-pentenal and 0.0495 mole of unchanged allyl alcohol corresponding to a conversion of 40.7% and a yield of 86.4%.

The following examples illustrate that certain acid salts as represented by sodium acid sulfate and certain free acids, at specific concentrations, as represented by phosphoric acid are also effective acidic type promoters in the process of the invention. Example 9, in which the catalyst is activated carbon that has not been impregnated with an acidic type promoter is included for purposes of comparison with the examples illustrating the process of the invention. Example 13 illustrates the importance of using the proper support material in the catalyst.

*Example 9*

During a period of 90 minutes, a mixture containing 0.128 mole of allyl alcohol, 0.256 mole of isobutyraldehyde and 0.402 mole of nitrogen was passed over 60 ml. of granular activated carbon at a temperature of 200° C. In this case, the carbon was a sample of Columbia Grade CXC supplied by the Carbide and Carbon Chemicals Corporation. Analysis of the reaction product showed 0.024 mole of 2,2-dimethyl-4-pentenal and 0.092 mole of unchanged allyl alcohol along with unchanged isobutyraldehyde. Thus, 18.8% of the allyl alcohol fed was converted to the olefinic aldehyde and the yield based on allyl alcohol consumed was 66.7%.

*Example 10*

The procedure of Example 9 was repeated except the catalyst consisted of 1% $NaHSO_4$ on the activated carbon of Example 9. Analysis of the reaction product collected as before showed 0.051 mole of 2,2-dimethyl-4-pentenal and 0.066 mole of unchanged allyl alcohol along with unchanged isobutyraldehyde. Thus, with the acid salt-containing catalyst, the conversion and yield were 39.8% and 82.2% respectively.

*Example 11*

The procedure of Example 9 was repeated except the catalyst consisted of 1.35% $H_3PO_4$ on the activated carbon support. The conversion and yield were 60.5% and 91.3% respectively.

*Example 12*

The procedure of Example 9 was repeated except the catalyst contained 10% $H_3PO_4$ on activated carbon support. In this run no evidence was found of the production of 2,2-dimethyl-4-pentenal.

*Example 13*

During a period of 90 minutes, a mixture containing 0.128 mole of allyl alcohol, 0.256 mole of isobutyraldehyde, 0.026 g. of $H_3PO_4$ and 0.402 mole of $N_2$ was passed through the reactor of Example 9 packed with Vycor cullet. In this case, only a trace amount of the olefinic aldehyde was produced thereby illustrating the significant role of the catalyst support in the successful accomplishment of the desired reaction.

By the use of an equivalent molecular amount of 2-methyl butanal, 2-ethyl butanal, 2-methyl pentanal, 2-methyl hexanal and 2-ethyl hexanal, respectively, in place of isobutyraldehyde in the examples illustrating the process of our invention 2-methyl-2-ethyl-4-pentenal, 2,2-diethyl-4-pentenal, 2-methyl-2-n-propyl-4-pentenal, 2-methyl-2-n-butyl-4-pentenal and 2-ethyl-2-n-butyl-4-pentenal, respectively, are obtained.

The 2,2-dialkyl-4-pentenals obtained in accordance with the process of the invention are known to be useful chemical intermediates. For example, they can be hydrogenated to the corresponding saturated alcohols and these can then be converted to esters of various mono and dicarboxylic acids such as the esters of acetic, propionic, butyric, succinic, adipic, sebacic, etc., acids. Many of these esters are useful as oxidation-resistant plasticizers. The 2,2-dialkyl-4-pentenals can also be oxidized to the corresponding 2,2-dialkyl pentenoic acids, the esters of which are useful monomers for the preparation of resinous polymers.

This invention has been described in detail with particular reference to preferred embodiments thereof, but it will be understood that variations and modifications can be effected within the spirit and scope of the invention as described hereinabove and as defined in the appended claims.

What we claim is:
1. A process for preparing 2,2-dialkyl-4-pentenals which comprises passing a mixture of allyl alcohol and a saturated aliphatic aldehyde having the general formula:

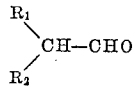

wherein $R_1$ and $R_2$ each represents an alkyl group of from 1–4 carbon atoms in a molar ratio of from 1:0.1 to 1:10 of allyl alcohol to saturated aliphatic aldehyde, in vapor phase at a temperature of from 125–450° C., over a catalyst comprising a support material selected from the group consisting of activated carbon and silica gel impregnated with 0.1 to 25 weight percent of an inorganic acidic compound selected from the group consisting of manganous sulfate, zinc sulfate, calcium chloride, magnesium sulfate, aluminum sulfate, alkali metal acid sulfates or about 0.1 to about 2 weight percent phosphoric acid at a gaseous hourly space velocity of from about 100 to 10,000.

2. A process according to claim 1 wherein the catalyst support material is activated carbon.

3. A process according to claim 1 wherein the saturated aliphatic aldehyde is isobutyraldehyde and wherein 2,2-dimethyl-4-pentenal is obtained.

4. A process according to claim 1 wherein the molar ratio of allyl alcohol to saturated aliphatic aldehyde is from 1:0.5 to 1:4, the reaction temperature is from 175–250° C. and the gaseous hourly space velocity is from 150–500.

5. A process for preparing 2,2-dimethyl-4-pentenal which comprises passing a mixture of allyl alcohol and isobutyraldehyde, in a molar ratio of from 1:0.5 to 1:4 of alcohol to aldehyde, in vapor phase at a temperature of from 175–250° C., over a catalyst comprising a support material selected from the group consisting of activated carbon and silica gel impregnated with 0.1 to 25 weight percent of an inorganic acidic compound selected from the group consisting of manganous sulfate, zinc sulfate, calcium chloride, magnesium sulfate, aluminum sulfate, alkali metal acid sulfates or about 0.1 to about 2 weight percent phosphoric acid, at a gaseous hourly space velocity of from 150–500.

6. The process according to claim 5, wherein the said catalyst comprises activated carbon impregnated with calcium chloride.

7. The process according to claim 5 wherein the said catalyst comprises activated carbon impregnated with manganous sulfate.

8. The process according to claim 5 wherein the said catalyst comprises activated carbon impregnated with zinc sulfate.

9. The process according to claim 5 wherein the said catalyst comprises activated carbon impregnated with magnesium sulfate.

10. The process according to claim 5 wherein the said catalyst comprises silica gel impregnated with manganous sulfate.

11. The process according to claim 5 wherein the said catalyst comprises activated carbon impregnated with from 1.0 to 2.0% of phosphoric acid, based on the catalyst weight.

12. The process according to claim 5 wherein nitrogen gas is added to the mixture of allyl alcohol and isobutyraldehyde as a diluent.

References Cited
UNITED STATES PATENTS

| | | | |
|---|---|---|---|
| 1,092,986 | 3/1933 | Barker | 252—422 |
| 1,903,705 | 4/1933 | Nikaido | 252—422 |
| 2,171,408 | 8/1939 | Smit | 252—422 |
| 2,245,582 | 6/1941 | Gallagher et al. | 260—601 |
| 2,947,786 | 8/1960 | Brannock | 260—601 |
| 2,957,028 | 10/1960 | Brannock et al. | 260—601 |

OTHER REFERENCES

A.P.C. application of Walter et al., Ser. No. 272,852, published July 13, 1943.

LEON ZITVER, *Primary Examiner.*

J. J. SETELIK, R. H. LILES, *Assistant Examiners.*

UNITED STATES PATENT OFFICE
CERTIFICATE OF CORRECTION

Patent No. 3,335,187                                    August 8, 1967

Charles W. Hargis et al.

It is hereby certified that error appears in the above numbered patent requiring correction and that the said Letters Patent should read as corrected below.

Column 2, line 38, after "acids" insert -- or in suitable salt form. However, the concentration of the free acids --; line 47, for "yield of" read -- conversion to --; same column 2, line 71, for "analysis" read -- Analysis --.

Signed and sealed this 20th day of August 1968.

(SEAL)
Attest:

Edward M. Fletcher, Jr.                          EDWARD J. BRENNER
Attesting Officer                                  Commissioner of Patents